United States Patent
Deluga et al.

(10) Patent No.: US 8,202,815 B2
(45) Date of Patent: Jun. 19, 2012

(54) CATALYST COMPOSITION FOR THE HYDRO-TREATMENT OF ALKANES AND METHODS OF USE THEREOF

(75) Inventors: Gregg Anthony Deluga, Los Angeles, CA (US); Daniel Lawrence Derr, San Diego, CA (US)

(73) Assignee: General Electric Company, Niskayuna, NY (US)

( * ) Notice: Subject to any disclaimer, the term of this patent is extended or adjusted under 35 U.S.C. 154(b) by 614 days.

(21) Appl. No.: 12/344,291

(22) Filed: Dec. 26, 2008

(65) Prior Publication Data
US 2010/0168485 A1    Jul. 1, 2010

(51) Int. Cl.
| | |
|---|---|
| B01J 29/06 | (2006.01) |
| B01J 21/00 | (2006.01) |
| B01J 29/00 | (2006.01) |
| B01J 23/00 | (2006.01) |
| B01J 23/56 | (2006.01) |
| B01J 23/44 | (2006.01) |
| B01J 23/42 | (2006.01) |
| B01J 23/70 | (2006.01) |
| B01J 23/74 | (2006.01) |
| C10G 69/02 | (2006.01) |
| C10G 47/02 | (2006.01) |
| C10G 47/24 | (2006.01) |
| C10G 47/12 | (2006.01) |
| C10G 47/16 | (2006.01) |
| C10G 47/04 | (2006.01) |
| C10G 47/20 | (2006.01) |
| C10G 47/00 | (2006.01) |
| C10G 11/02 | (2006.01) |
| C10G 11/04 | (2006.01) |
| C10G 11/00 | (2006.01) |
| C10G 35/00 | (2006.01) |
| C10G 35/04 | (2006.01) |
| C10G 35/06 | (2006.01) |
| C07C 5/13 | (2006.01) |
| C07C 4/02 | (2006.01) |
| C07C 4/08 | (2006.01) |
| C07C 6/00 | (2006.01) |
| C01B 33/36 | (2006.01) |
| C01B 39/00 | (2006.01) |
| C01F 7/00 | (2006.01) |

(52) U.S. Cl. ........... 502/66; 502/64; 502/71; 502/74; 502/77; 502/258; 502/259; 502/260; 502/261; 502/262; 502/263; 502/325; 502/332; 502/333; 502/334; 502/335; 502/336; 502/337; 502/338; 502/339; 208/60; 208/108; 208/109; 208/110; 208/111.35; 208/118; 208/119; 208/120.35; 208/121; 208/122; 208/124; 208/133; 208/134; 208/137; 208/138; 585/734; 585/739; 585/750; 585/752; 423/700; 423/DIG. 22; 423/DIG. 23; 423/DIG. 25; 423/DIG. 27

(58) Field of Classification Search .............. 208/60, 208/108–110, 111.35, 118, 119, 120.35, 208/121, 122, 124, 133, 134, 137, 138; 502/64, 502/66, 71, 74, 77, 258–263, 325, 332–339; 585/734, 739, 750, 752; 423/700, DIG. 22, 423/DIG. 23, DIG. 25, DIG. 27
See application file for complete search history.

(56) References Cited

U.S. PATENT DOCUMENTS

| | | | |
|---|---|---|---|
| 3,301,917 A * | 1/1967 | Wise | 585/739 |
| 3,376,215 A * | 4/1968 | Bertolacini et al. | 208/138 |
| 3,464,929 A * | 9/1969 | Mitsche | 502/66 |
| 3,546,102 A * | 12/1970 | Bertolacini | 208/138 |
| 3,830,724 A * | 8/1974 | Schutt | 208/111.15 |
| 4,409,092 A | 10/1983 | Johnson et al. | |
| 4,724,066 A | 2/1988 | Kirker et al. | |
| 4,764,266 A | 8/1988 | Chen et al. | |
| 4,846,959 A | 7/1989 | Kennedy et al. | |
| 4,851,109 A | 7/1989 | Chen et al. | |
| 4,855,530 A * | 8/1989 | LaPierre et al. | 585/739 |
| 4,992,605 A | 2/1991 | Craig et al. | |
| 5,510,306 A | 4/1996 | Murray | |
| 5,565,088 A | 10/1996 | Nair et al. | |
| 5,625,108 A | 4/1997 | Perego et al. | |
| 6,524,470 B1 * | 2/2003 | Kasztelan et al. | 208/111.05 |

| | | | |
|---|---|---|---|
| 2004/0028584 | A1 | 2/2004 | Juttu |
| 2005/0143610 | A1 | 6/2005 | Mitchell et al. |
| 2005/0194289 | A1 | 9/2005 | Overbeek et al. |
| 2005/0258076 | A1 | 11/2005 | Houzvicka |
| 2007/0068848 | A1 | 3/2007 | Monnier et al. |

FOREIGN PATENT DOCUMENTS

| | | |
|---|---|---|
| FI | 100248 B | 10/1997 |
| GB | 830882 | 3/1960 |
| GB | 1339554 A | 12/1973 |
| WO | WO2007063872 A1 | 7/2007 |

OTHER PUBLICATIONS

Zhou et al., "Hybrid Zirconia Catalysts for Conversion of Fischer-Tropsch Waxy Products to Transportation Fuels", Fuel Process Technology, vol. 83, pp. 67-80, 2003.

Calemma et al., "Hydroisomerization and Hydrocracking of Long Chain n-Alkanes on Pt/Amorphous SiO2—Al2O3 Catalyst", Applied Catalysis A: General 190, pp. 207-218, 2000.

\* cited by examiner

*Primary Examiner* — Patricia L Hailey

(74) *Attorney, Agent, or Firm* — Francis T. Coppa

(57) ABSTRACT

In one embodiment, a catalyst composition comprises from about 5 weight percent to about 70 weight percent of silica-alumina; from about 30 weight percent to about 90 weight percent alumina; and from about 0.01 weight percent to about 2.0 weight percent of a group VIII metal. In another embodiment, a method for processing hydrocarbons comprises hydro-treating the hydrocarbons in the presence of a catalyst composition, wherein the catalyst comprises from about 5 weight percent to about 70 weight percent silica-alumina; from about 30 weight percent to about 90 weight percent alumina; and from about 0.01 weight percent to about 2.0 weight percent of a group VIII metal.

24 Claims, 3 Drawing Sheets

CATALYST COMPOSITION FOR THE HYDRO-TREATMENT OF ALKANES AND METHODS OF USE THEREOF

STATEMENT REGARDING GOVERNMENT INTERESTS

This invention was made with Government support under Contract No. W911NF-07-C-0045 awarded by the United States Army REDCOM. The Government has certain rights in the invention.

TECHNICAL FIELD

The invention includes embodiments that relate to a catalyst. More particularly, the invention includes embodiments that relate to a catalyst composition for the conversion of hydrocarbons to middle distillate fuels.

DISCUSSION OF ART

Increasing crude oil prices and increased environmental concerns have resulted in a growing interest in renewable energy sources. As demonstrated by the current direction of research, renewable resources like solar power and wind energy are used for the production of electricity, whereas the fuels derived from biomass are predominantly used as transportation fuels.

One method of converting biomass sources to fuels involves producing oils from oilseeds and other feedstocks. These methods typically involve conversion to a diesel-like fuel, which is conventionally made by trans-esterification of oil derived from oilseeds, vegetable oils and animal fats. Trans-esterification involves a reaction with alcohol, and produces a mixture of esters of fatty acids. These fatty acid esters are typically called "biodiesel". Biodiesel is better suited for fuel applications than pure oils and fats, due to more advantageous characteristics, such as cold flow properties, combustion properties and the like. However, the use of the fatty acid ester fuels can result in operating problems, especially at low temperatures. Hence, the use of biodiesel in colder regions may be somewhat limited.

Current methods of producing diesel-like-fuel from vegetable oil sources include direct hydro-treating of the bio-oils. This results in the breakdown of the triglycerides, which are primary constituents of the bio-oils. The reaction with hydrogen also results in saturation of double bonds, thus producing linear alkane fuel mixtures, which have better operating ranges. In order to effectively produce fuels other than diesel, a catalyst is needed which is selective for producing middle distillate fuels. Accordingly, it is desirable to have a catalyst that is active for hydro-isomerization and hydrocracking, and that selectively converts alkanes into middle distillate fuels.

BRIEF DESCRIPTION

Figure 1:
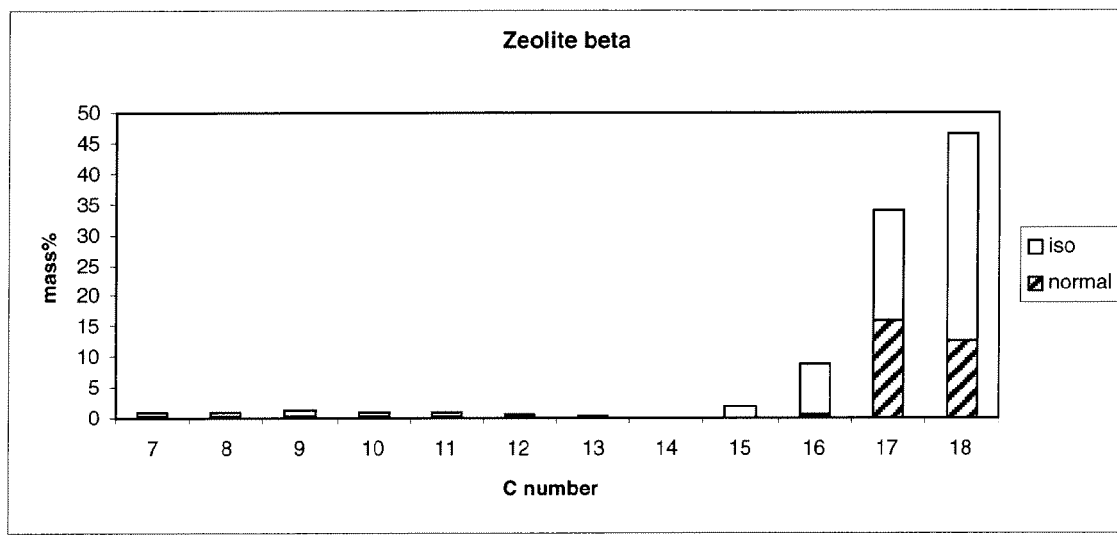
FIG. 1 illustrates isomerization of a soy oil feedstock over a catalyst of 30 weight percent zeolite beta, 69.5 weight percent alumina, and 0.50 weight percent platinum.

In accordance with an embodiment of the invention, there is provided a catalyst composition comprising from about 5 weight percent to about 70 weight percent silica-alumina; from about 30 weight percent to about 90 weight percent alumina; and from about 0.01 weight percent to about 2.0 weight percent of a group VIII metal.

In accordance with another embodiment of the invention, there is provided a method for processing hydrocarbons. The method comprises hydro-treating the hydrocarbons in the presence of a catalyst composition, wherein the catalyst comprises from about 5 weight percent to about 70 weight percent of silica-alumina; from about 30 weight percent to about 90 weight percent alumina; and from about 0.01 weight percent to about 2.0 weight percent of a group VIII metal.

DETAILED DESCRIPTION

The invention includes embodiments that relate to a catalyst composition. The invention also includes embodiments that relate to a method of processing hydrocarbons in the presence of the catalyst composition. The catalyst composition may selectively convert alkanes to a mixture of cycloalkanes, paraffins, and iso-paraffins. This mixture can be used as various fuels, such as diesel fuel, kerosene and jet fuel, which are often referred to as middle distillate fuels.

As used herein, without further qualifiers a catalyst is a substance that can increase the rate of a chemical reaction without being consumed in the reaction. A zeolite is a crystalline metal oxide material that comprises a micro-porous structure. Silica-alumina is an amorphous metal oxide that comprises a random micro-porous structure. Approximating language, as used herein throughout the specification and claims, may be applied to modify any quantitative representation that could permissibly vary without resulting in a change in the basic function to which it is related. Accordingly, a value modified by a term such as "about" or "approximately" is not to be limited to the precise value specified. In some instances, the approximating language may correspond to the precision of an instrument for measuring the value.

In one embodiment, the catalyst composition comprises a zeolite. The zeolite may be naturally occurring or synthetic. Examples of suitable zeolites are zeolite Y, zeolite beta, ferrierite, mordenite, zeolite ZSM-5, zeolite ZSM-22/23 or the like, or a combination comprising at least one of the foregoing zeolites. Zeolite ZSM-5 and Zeolite ZSM-22/23 are commercially available from Zeolyst International (Valley Forge, Pa.). An exemplary zeolite is zeolite beta.

Examples of suitable commercially available zeolites include those marketed under the following trademarks: CBV100, CBV300, CBV400, CBV500, CBV600, CBV712, CBV720, CBV760, CBV780, CBV901, CP814E, CP814C, CP811C-300, CP914, CP914C, CBV2314, CBV3024E, CBV5524G, CBV8014, CBV28014, CBV10A, CBV21A, CBV90A. The foregoing zeolites are available from Zeolyst International, and may be used individually or in a combination comprising two or more of the zeolites.

In one embodiment, the zeolite has a silicon to aluminum ratio in a range between about 1 and about 50. In one embodiment, the zeolite has a silicon to aluminum ratio in a range between about 50 and about 100. In one embodiment, the zeolite has a silicon to aluminum ratio in a range between about 100 and about 200. In another embodiment, the zeolite has a silicon to aluminum ratio in a range between about 200 and about 300. In an exemplary embodiment, the zeolite has a silicon to aluminum ratio in a range between about 40 and about 60.

The zeolite particles may have an average particle size of less than about 50 micrometers. In one embodiment, the zeolite particles have an average particle size of about 50 micrometers to about 400 micrometers. In another embodiment, the zeolite particles have an average particle size of about 400 micrometers to about 800 micrometers. In another embodiment, the zeolite particles have an average particle size of about 800 micrometers to about 1600 micrometers.

The zeolite particles may have a surface area of about 200 $m^2/gm$ to about 300 $m^2/gm$. In one embodiment, the zeolite particles have a surface area of about 300 $m^2/gm$ to about 400 $m^2/gm$. In another embodiment, the zeolite particles have a surface area of about 400 $m^2/gm$ to about 500 $m^2/gm$. In yet another embodiment, the zeolite particles have a surface area of about 500 $m^2/gm$ to about 600 $m^2/gm$.

Desirably, the zeolite is present in an amount of about 5 to about 70 weight percent, based upon the total weight of the catalyst composition. In one embodiment, the zeolite is present in an amount of about 5 to about 20 weight percent, based upon the total weight of the catalyst composition. In one embodiment, the zeolite is present in an amount of about 20 to about 30 weight percent, based upon the total weight of the catalyst composition. In another embodiment, the zeolite is present in an amount of about 30 to about 40 weight percent, based upon the total weight of the catalyst composition. In another embodiment, the zeolite is present in an amount of about 40 to about 50 weight percent, based upon the total weight of the catalyst composition. In another embodiment, the zeolite is present in an amount of about 50 to about 60 weight percent, based upon the total weight of the catalyst composition. In yet another embodiment, the zeolite is present in an amount of about 60 to about 70 weight percent, based upon the total weight of the catalyst composition. In a preferred embodiment, the zeolite is present in an amount of about 10 to about 30 weight percent, based upon the total weight of the catalyst composition As noted above, the catalyst composition comprises alumina ($Al_2O_3$) binder. In one embodiment, the alumina is present in an amount of about 30 to about 40 weight percent, based upon the total weight of the catalyst composition. In one embodiment, the alumina is present in an amount of about 40 to about 50 weight percent, based upon the total weight of the catalyst composition. In another embodiment, the alumina is present in an amount of about 50 to about 60 weight percent, based upon the total weight of the catalyst composition. In another embodiment, the alumina is present in an amount of about 60 to about 70 weight percent, based upon the total weight of the catalyst composition. In another embodiment, the alumina is present in an amount of about 70 to about 80 weight percent, based upon the total weight of the catalyst composition. In yet another embodiment, the alumina is present in an amount of about 80 to about 90 weight percent, based upon the total weight of the catalyst composition. In an exemplary embodiment, the alumina is present in an amount of about 70 to about 90 weight percent, based upon the total weight of the catalyst composition.

The catalyst composition also comprises at least one group VIII metal. Examples of suitable group VIII metals are iron, cobalt, nickel, ruthenium, rhodium, palladium, platinum, osmium, iridium, or a combination comprising at least two of the foregoing metals. In a preferred embodiment, the group VIII metal is platinum.

The group VIII metal may be present in the catalyst composition in an amount of about 0.01 to about 0.10 weight percent, based upon the total weight of the catalyst composition. In another embodiment, the group VIII metal is present in an amount of about 0.10 to about 0.50 weight percent, based upon the total weight of the catalyst composition. In another embodiment, the group VIII metal is present in an amount of about 0.50 to about 1.0 weight percent, based upon the total weight of the catalyst composition. In yet another embodiment, the group VIII metal is present in an amount of about 1.0 to about 2.0 weight percent, based upon the total weight of the catalyst composition. In an exemplary embodiment, the group VIII metal is present in an amount of about 0.50 to about 1.00 weight percent, based upon the total weight of the catalyst composition.

The catalyst composition further comprises silica-alumina (SiAl). The average silica-alumina particle size may be from about 0.1 nanometer to about 100 nanometers. In one embodiment, the average silica-alumina particle size is from about 100 nanometers to about 200 nanometers. In another embodiment, the average silica-alumina particle size is from about 200 nanometers to about 300 nanometers. In another embodiment, the average silica-alumina particle size is from about 300 nanometers to about 400 nanometers. In yet another embodiment, the average silica-alumina particle size is from about 400 nanometers to about 500 nanometers.

The catalyst composition may comprise silica-alumina in an amount of about 5 to about 20 weight percent, based upon the total weight of the catalyst composition. In one embodiment, the silica-alumina is present in an amount of about 20 to about 30 weight percent, based upon the total weight of the catalyst composition. In another embodiment, the silica-alumina is present in an amount of about 30 to about 40 weight percent, based upon the total weight of the catalyst composition. In another embodiment, the silica-alumina is present in an amount of about 40 to about 50 weight percent, based upon the total weight of the catalyst composition. In another embodiment, the silica-alumina is present in an amount of about 50 to about 60 weight percent, based upon the total weight of the catalyst composition. In yet another embodiment, the silica-alumina is present in an amount of about 60 to about 70 weight percent, based upon the total weight of the catalyst composition. In an exemplary embodiment, the silica-alumina is present in an amount of about 10 to about 30 weight percent, based upon the total weight of the catalyst composition.

The catalyst composition disclosed herein is effective at converting hydrocarbons to middle distillate fuels. In a preferred embodiment, $C_8$ to $C_{40}$ alkanes, and more preferably $C_{12}$ to $C_{22}$ alkanes, are converted to middle distillate fuels by the catalyst composition. In one embodiment, the catalyst composition converts alkanes, such as heavy n-paraffins, to a mixture of cycloalkanes, paraffins and iso-paraffins.

The conversion of the hydrocarbons to middle distillate fuels may be accomplished by hydro-treating the hydrocarbons in the presence of the catalyst composition. As used herein, "hydro-treating" refers to hydro-cracking or hydro-isomerization. Hydro-isomerization typically involves the reaction of linear alkanes with hydrogen over catalysts, to produce branched compounds. Branched isomers of paraffins have higher octane numbers than the corresponding normal straight alkanes and hence, are a desirable component of the fuel. Other properties such as flash point, freezing point and the like are maintained in specified ranges for each variety. Isomerization is also useful for improving the cloud point of the fuel, resulting in improved usability of the fuel at low temperatures.

Typical temperatures maintained during hydro-treating are between about 200 degrees Celsius and about 450 degrees Celsius. A typical pressure range for the hydro-treating operation is between about 10 bar and about 80 bar. In some embodiments, a pressure range of about 40 to about 60 bar, and a temperature range of about 275 degrees Celsius to about 350 degrees Celsius, may be more preferred. Typically the reaction involves rearrangement of the alkyl groups. In general terms, the hydro-isomerization may be represented as:

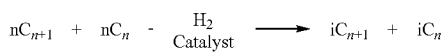

The prefix "i" represents the isomers with a branched molecular structure. Thus, compounds represented by formulae $iC_{n+1}$ and $iC_n$ represent isomers with different carbon chain lengths. Thus, hydro-isomerization changes the carbon number distribution in the reactant compounds to the distribution in the product compounds. In some instances, hydro-isomerization may also include hydrocracking reactions. The hydro-isomerization usually results in the production of branched alkanes (paraffins and iso-paraffins) of various chain lengths, and cyclic compounds such as cycloalkanes. The composition of product compounds may vary, depending upon the type of fatty acids involved in the glycerides or bio-oil feedstock, as well as process conditions. For a soybean seed feedstock, hydro-isomerization can produce a mixture of about 5% LPG (butane), about 5% naphtha and gasoline, about 50% jet fuel, and about 40% diesel fuel. However, the product composition varies widely, based on the operating conditions and specific catalysts used.

Examples

The following examples illustrate methods and embodiments in accordance with the invention, and as such should not be construed as imposing limitations upon the claims.

Examples 1-3 illustrate the distribution of product compounds obtained when hydro-treated soy oil is hydro-isomerized/hydocracked over three different catalyst compositions. Hydrotreated soy oil is a roughly 50/50 mixture of n-heptadecane and n-octadecane. The resulting figures only display products comprising $C_7$ to $C_{18}$ product compounds. The relative ratio of non-isomerized to isomerized product is shown.

Example 1

Referring to FIG. 1, a catalyst comprising 30 weight percent zeolite beta, 69.5 weight percent alumina binder, and 0.50 weight percent platinum is used in the hydro-isomerization of a soy oil feedstock. The isomerization of the feedstock occurs preferentially, as indicated by the low levels of $C_7$ to $C_{14}$ isomerized product.

Example 2

Figure 2:
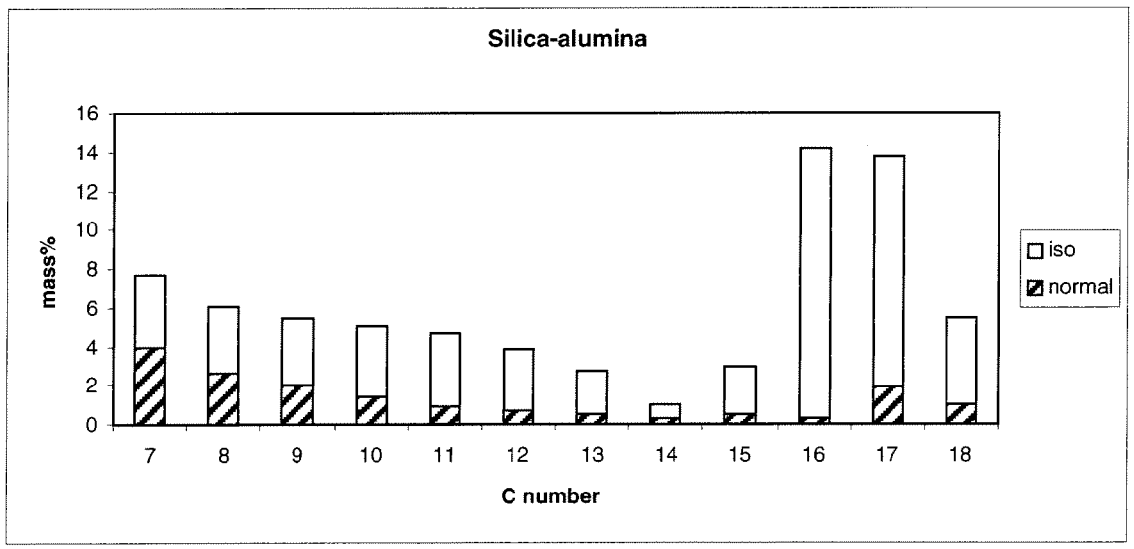
FIG. 2 illustrates results of hydro-treating a soy oil feedstock over a catalyst that includes 30 weight percent silica-alumina support, 69.5 weight percent alumina, and 0.50 weight percent platinum.

FIG. 2 illustrates the results of hydro-treating a soy oil feedstock over a catalyst comprising 30 weight percent silica-alumina support as the active component, 69.5 weight percent alumina binder, and 0.50 weight percent platinum. As shown, a higher level of hydro-isomerization is observed in the product compounds as compared to Example 1.

Example 3

Figure 3:
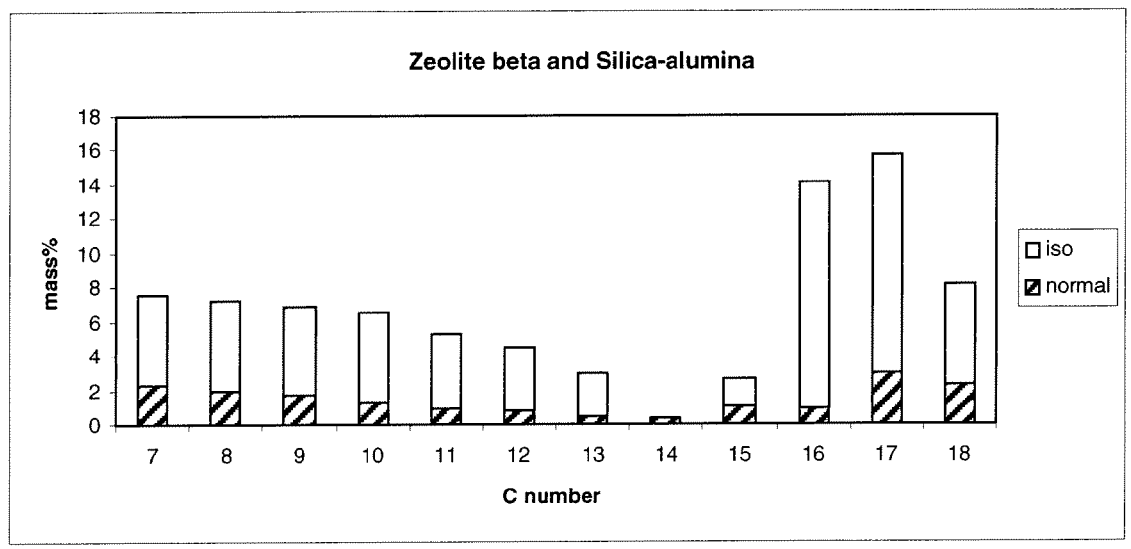
FIG. 3 shows isomerization results of mixed catalyst

A catalyst comprising 25 weight percent zeolite beta, 25 weight percent silica-alumina support, 49.5 weight percent alumina binder, and 0.50 weight percent platinum is used in the hydro-isomerization of the soy oil feedstock. As displayed in FIG. 3, use of the mixed catalyst results in a higher ratio of isomerized product to non-isomerized product relative to Examples 1 and 2, which provides a better freezing point, flash point and combustion characteristic for the resulting middle distillate fuel.

All ranges disclosed herein are inclusive of the endpoints, and the endpoints are combinable with each other. The terms "first," "second," and the like as used herein do not denote any order, quantity, or importance, but rather are used to distinguish one element from another. The use of the terms "a" and "an" and "the" and similar referents in the context of describing the invention (especially in the context of the following claims) are to be construed to cover both the singular and the plural, unless otherwise indicated herein or contradicted by context.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A catalyst composition comprising:
   from about 5 weight percent to about 70 weight percent of silica-alumina;
   from about 30 weight percent to about 90 weight percent alumina binder; and
   from about 0.01 weight percent to about 2.0 weight percent of a group VIII metal.

2. The catalyst composition of claim 1, further comprising:
   from about 5 weight percent to about 70 weight percent of a zeolite.

3. The catalyst composition of claim 2, wherein the zeolite comprises zeolite Y, zeolite beta, ferrierite, mordenite, zeolite ZSM-22/23, zeolite ZSM-5 or combinations thereof.

4. The catalyst composition of claim 3, wherein the zeolite comprises zeolite beta.

5. The catalyst composition of claim 2, wherein the zeolite is present in an amount in a range of from about 10 weight percent to about 30 weight percent.

6. The catalyst composition of claim 2, wherein the zeolite comprises silicon and aluminum, and wherein the zeolite has a silicon to aluminum ratio in a range between about 1.0 and about 300.

7. The catalyst composition of claim 2, wherein the zeolite has a pore size in a range between about 1 nm to about 100 nm.

8. The catalyst composition of claim 1, wherein the alumina is present in an amount in a range of from about 70 weight percent to about 90 weight percent.

9. The catalyst composition of claim 1, wherein the group VIII metal is present in an amount in a range of from about 0.50 weight percent to about 1.00 weight percent.

10. The catalyst composition of claim 1, wherein the group VIII metal comprises iron, cobalt, nickel, ruthenium, rhodium, palladium, osmium, iridium, platinum or a combination thereof.

11. The catalyst composition of claim 10 wherein the group VIII metal comprises platinum.

12. A method for processing hydrocarbons comprising:
    hydro-treating hydrocarbons in the presence of a catalyst composition, wherein the catalyst comprises:

from about 5 weight percent to about 70 weight percent silica-alumina;

from about 30 weight percent to about 90 weight percent alumina; and about 0.01 weight percent to about 2.0 weight percent of a group VIII metal.

13. The method of claim 12, wherein the catalyst further comprises:

from about 5 weight percent to about 70 weight percent of a zeolite.

14. The method of claim 13, wherein the zeolite comprises zeolite Y, zeolite beta, ferrierite, mordenite, zeolite ZSM-22/23, zeolite ZSM-5 or combinations thereof.

15. The method of claim 13, wherein the zeolite is present in an amount in a range of from about 10 weight percent to about 30 weight percent.

16. The method of claim 12, wherein the alumina is present in an amount in a range of from about 70 weight percent to about 90 weight percent.

17. The method of claim 12, wherein the group VIII metal is present in an amount in a range of from about 0.50 weight percent to about 1.00 weight percent.

18. The method of claim 12, wherein the group VIII metal comprises iron, cobalt, nickel, ruthenium, rhodium, palladium, osmium, iridium, platinum or a combination thereof.

19. The method of claim 12, wherein hydro-treating comprises:

hydro-isomerization, hydrocracking, or a combination thereof.

20. The method of claim 12, wherein hydro-treating the hydrocarbons takes place at a temperature in a range between about 200 degrees Celsius to about 450 degrees Celsius.

21. The method of claim 20, wherein hydro-treating the hydrocarbons takes place at a temperature in a range between about 275 degrees Celsius to about 350 degrees Celsius.

22. The method of claim 12, wherein the hydrocarbons are alkanes.

23. The method of claim 22, wherein at least some of the hydrocarbons are n-paraffins.

24. The method of claim 12, wherein hydro-treating the hydrocarbons converts the hydrocarbons to a mixture comprising cycloalkanes, iso-paraffins and paraffins.

* * * * *